United States Patent [19]
Ashley et al.

[11] Patent Number: 4,881,076
[45] Date of Patent: Nov. 14, 1989

[54] ENCODING FOR PIT-PER-TRANSITION OPTICAL DATA RECORDING

[75] Inventors: Jonathan J. Ashley, Peekskill, N.Y.; Mark G. Call, Longmont, Colo.; Paul H. Siegel, San Jose, Calif.

[73] Assignee: International Business Machines Corporation, Armonk, N.Y.

[21] Appl. No.: 126,653

[22] Filed: Dec. 1, 1987

[51] Int. Cl.$^4$ ............................................... H03M 7/16
[52] U.S. Cl. ............................................ 341/95; 341/59
[58] Field of Search .................. 369/54, 58, 107, 115, 369/59; 341/59, 95

[56] References Cited

U.S. PATENT DOCUMENTS 4,486,739 12/1984 Franaszek et al. ..................... 341/59
4,539,691 9/1984 Ogawa et al. .......................... 341/95
4,672,362 6/1987 Furukawa et al. ..................... 341/95

Primary Examiner—William M. Shoop, Jr.
Assistant Examiner—Helen Kim
Attorney, Agent, or Firm—Carl M. Wright

[57] ABSTRACT

Encoding method for data to be recorded on optical disks using the pit-per-transition technique or return-to-zero techniques whereby the characteristics of the encoded bits produce a stable, low frequency spectral notch and minimum interference with associated focus and tracking servomechanisms. RLL (d,k) code words are selected so that the ratio of the lengths of pits and lands approximate some nonzero fraction less than one-half which depends on the (d,k) code employed. For example, a fraction of ⅓ is appropriate for RLL (2,7).

8 Claims, 2 Drawing Sheets

ENCODING FOR PIT-PER-TRANSITION OPTICAL DATA RECORDING

BACKGROUND OF THE INVENTION

1. Field of the Invention

This invention relates to data recording codes having predetermined characteristics, particularly to run-length-limited (d,k) codes for optical recordings of data and minimum interference with associated servo systems.

2. Description of Related Art

Recording binary information in its original form presents problems because of the nature of the recording channel which is analogous to a communication channel and includes the circuits for recording and retrieving stored data. A channel can transmit and receive (record and retrieve) data at a rate termed the channel capacity which depends on bandwidth, noise, and other channel parameters.

The recording channel, hereinafter referred to as channel, has the same kinds of characteristics as communication channels. Magnetic recorders, for example, have a low frequency limit because of the inability to record and to retrieve d-c signals using magnetic media. Optical recorders, on the other hand, have the capability of recording and reading d-c signals, but a-c coupled amplifiers are usually used to amplify the signals because they provide more gain with less complicated circuitry than d-c coupled amplifiers. Because of a-c coupling in the amplifiers, however, optical readers also have a low frequency limitation.

The timing signals in most data recordings are derived from the same channel as the data and are extracted by filters, special logic circuits, or the like. In optical recordings, the servo signals, used both to keep the lens system at best focus, and to position the head properly over the desired data track, is a low frequency signal. Data containing low frequency spectral power interfere with the servo signal.

It is well known to record data having a spectral density that matches the transfer characteristics of the channel. This may sometimes cause a higher than average error rate for data sequences having certain characteristics but it enables a channel to operate at higher capacity. Some coding schemes for data recording are described in the following references:

1. K. A. Immink, "Modulation Systems for Digital Audio Disks with Optical Readout," *Proc. IEEE Int. Conf. on Acoustics, Speech and Signal Processing* (Atlanta, 1981), pp. 587–589.
2. A. M. Patel, "Zero Modulation Encoding for Magnetic Recording," *IBM J. Res. and Dev.*, Vol. 19, No. 4, July, 1975, pp. 366–378.
3. J. C. Mallinson and J. W. Miller, "Optimal Codes for Digital Magnetic Recording," *The Radio and Electronic Engineer*, Vol. 47, No. 4, April, 1977, pp. 172–176.
4. G. L. Pierobon, "Codes for Zero Spectral Density at Zero Frequency," *IEEE Trans. Info. Th.*, Vol. IT-30, No. 2, March, 1984, pp. 435–439.
5. R. Adler, D. Coppersmith, and M. Hassner, "Algorithms for Sliding Block Codes," *IEEE Trans. Info. Th.*, Vol. IT-29, No. 1, January, 1983, pp. 5–22.

The references describe recording techniques such as NRZ (Non-Return to Zero) code, recording bits by a transition, i.e., change of voltage level, on the media for each recorded bit that differs from its predecessor. In Reference (3), it is described as NRZ(LEVEL) or NRZ(L). NRZ(MARK) or NRZ(M), on the other hand, is a recording technique by which binary ones are recorded as transitions in the middle of a data interval (bit cell) and binary zeros are ignored. (A bit cell or data interval is the distance or time interval on the channel or media assigned to each bit. The bit cell size is limited by the channel bandwidth.)

Also described in the references are encoding techniques which substitute one binary word for another so that the undesirable spectral qualities of recorded data bit sequences can be eliminated by substituting encoded bit sequences having spectral characteristics that more closely match the transfer characteristics of the channel.

One desirable characteristic is a zero d-c spectral component, i.e., the Fourier transform of the signal over some large interval has no constant value. Physically, if binary ones are represented by $+v$ and binary zeros, by $-v$, the area above the baseline and the area below will be equal over given intervals, corresponding to the absence of a d-c spectral component represented by a Fourier transform constant value of zero. Alternating ones and zeros, for example, have no d-c spectral component over intervals which are multiples of two bit cells.

Since arbitrary input data can have long sequences of binary ones or binary zeros, theoretically infinitely long for an infinite number of data bits, there will be a d-c spectral component if the encoded bits are equal to the data bits. The encoded bits are selected so that the number of binary ones or binary zeros that can occur in sequence is limited. In an y-bit encoded word, the minimum number of zeros that are allowed to occur in sequence is designated by d and the maximum, by k. Such codes are called Run-Length-Limited (RLL) codes and are denoted by (d,k). A (2,7) code means that encoded binary ones must be separated by at least two and not more than seven binary zeros.

The above references describe such codes, also known as group or block codes, which can be selected according to (d,k) criteria so that the d-c spectral component averages to zero.

The described prior art techniques suitable for use with magnetic media are not satisfactorily applicable to optical recordings using pit-per-transition techniques because of differing channel characteristics. The invention described and claimed herein is directed to a method that is especially adapted to encoding for the PPT optical recording art.

SUMMARY OF THE INVENTION

In accordance with the invention, encoded words to be recorded are selected according to (d,k) criteria with the additional requirement that the average ratio of the number of recorded ones to recorded zeros substantially equals a predetermined fraction less than one. For (d,k) values (2,7), for example, the predetermined fraction is one-third for nearly optimal results in recording techniques such as optical pit-per-transition or return-to-zero magnetic recording.

The method according to the invention generates encoded (channel) words having spectral characteristics which minimize and stabilize the fluctuations of the low frequency notch near the d-c component. This reduces interference with the servomechanisms used with optical disk devices, and helps to alleviate undesirable distortion resulting from a-c coupling.

BRIEF DESCRIPTION OF THE DRAWING

The invention is described in detail by referring to the figure which relates to specific embodiments of the invention.

DESCRIPTION OF THE PREFERRED EMBODIMENT

In the following description, the term data bits refers to the binary digits representing the original data to be recorded. The term encoded bits refers to the binary digits that are actually recorded on the media. Data bits are converted so that x data bits are encoded into y encoded bits.

In the following description and claims, the terms (binary) ones and zeros can be interchanged. The binary values recorded with the shorter transition are referred to as (binary) ones by convention only.

The ratio of x/y, i.e., the number of data to corresponding encoded bits, is referred to as the data ratio or code rate. When less than one-half, high frequency clocks and detection circuits are required to maintain an acceptable code rate.

In pit-per-transition (PPT) optical recording, a data stream of binary ones and zeros is recorded on the optical disk as a series of pits, or marks, at each transition of the encoded bits.

In FIG. 1A, a byte (eight-bit data word) is shown having high vales for binary ones and low values for binary zeros. Each bit occupies a data (bit) cell, i.e., a time period allocated for each binary digit. The byte shown is designated B1 in hexadecimal notation, 10110001 in binary. To provide a code that has better spectral properties, the illustrative byte is encoded into a 13-bit binary word, for example, 0100010000010 (FIG. 1B), which can represent a word having (d,k) characteristics for d = 2 and k = 7.

FIG. 1C represents a PWM (pulse width modulation) signal for recording the 13-bit binary word shown in FIG. 1B by a transition that occurs in the center of a bit cell containing a binary one. The encoded words are selected so that the accumulated total area between the baseline and the signal, considering lows to be $-v$ and highs to be $+v$, is substantially zero over given intervals. This eliminates all but a transient spectral component at zero frequency, i.e., negligible power at d-c.

FIG. 1D represents the recording on an optical disk, the cross-hatched area indicating a pit etched along a circular path (track) on the disk's surface. The etched pits may be reflective and the unetched portions (lands) are opaque on an optical disk. An optical disk recorded with equal areas—or equal lengths since the width of the pit is constant—will appear to be an even, gray tone halfway between black and white if the pits are considered white and the lands, black.

Figure 1:
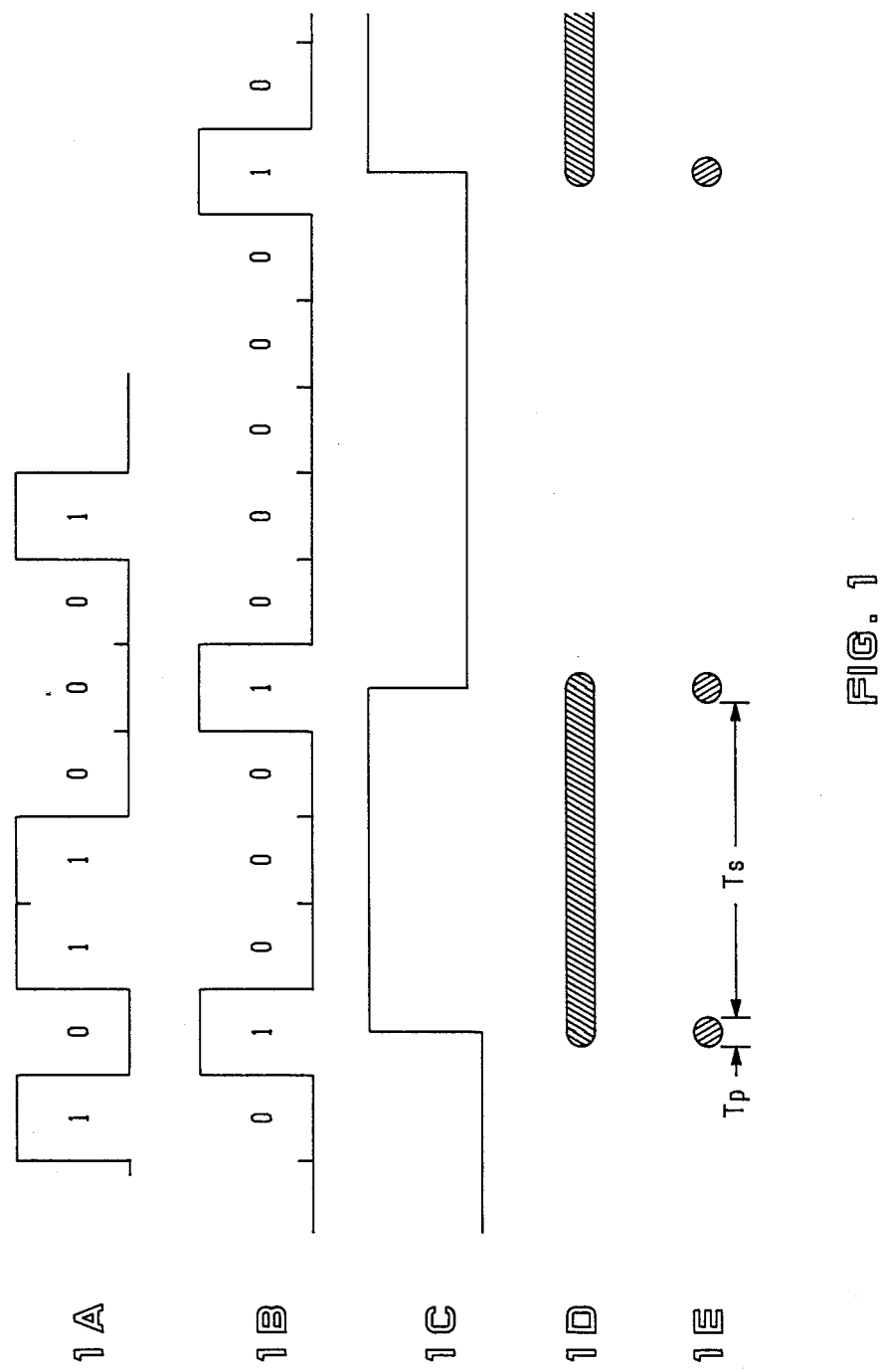
FIG. 1 is a diagram of signals used to explain the invention.
Figure 2:
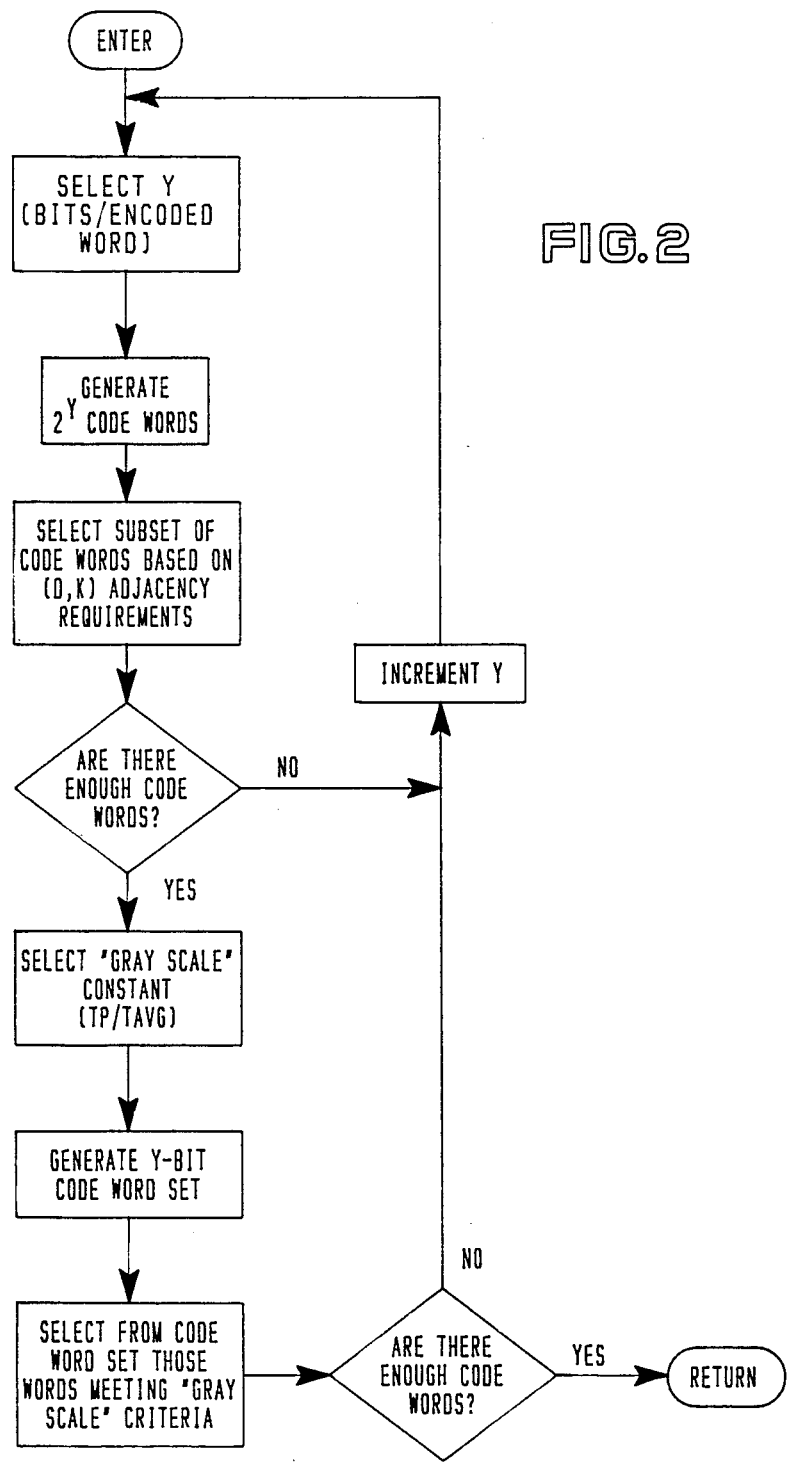

FIG. 1E illustrates the PWM recorded using the PPT techniques. The diameter of the pit is designated Tp and the spaces between pit edges, Ts. (The ratios of Ts to Tp are exaggerated for purposes of illustration in FIG. 1; the time base of the illustrated signals are not necessarily equal.) Since Tp is small with respect to Ts, it is nearly impossible to use the prior art techniques to select a code for PPT recordings that will result in a 50% gray scale. The most desirable (2,7) code cannot be used for PPT recordings in a way that will create zero d-c spectral power because the distance between pits can never be reduced to the pit diameter.

The method according to the invention derives optimal codes by selecting a gray scale, i.e. ratio of the lengths of pits to total track length, less than 50% but having a predetermined low frequency notch at low frequency.

A code is selected having the characteristic of $Tp/Tavg$ equal to some constant, where Tavg is equal to half the sum of the minimum and maximum values of Ts.

In (2,7) RLL codes, the probability of a bit being a binary one is approximately 0.22 and of being a binary zero, 0.78 so that attempting to generate a code that forces the probability of binary zeros and ones to be equal, i.e., both equal to 0.5, is too costly in terms of code capacity (inordinately large number of encoded bits compared to the number of data bits or a small rate ratio.). If $r = Tp/Ts$, it is equivalent to forcing the value of r to one-half.

According to the invention, a value of r is selected to be greater than zero and less than one-half. The value selected depends on several factors such as the depth of the low frequency notch, the diameter of pits, and the like. A suitable value of r for (2,7) RLL code is approximately $\frac{1}{3}$. Other values can be ascertained by those skilled in the art given the teachings of the invention. The generation of a suitable PPT code according to the invention is accomplished by selecting from the $2^y$ possible y-bit words, a subset of km words where m is the number of data words to be encoded and k is an integer greater than zero.

Since the number of bits in the encoded words, y, should be as small as possible so as not to reduce the data rate unnecessarily, the minimum value of y can be determined empirically by assigning an integer value to y close to $\log_2 m$ (or x) plus some integer that will make a (2,7) code possible. The minimum value of y for a (2,7) code is nine. For example, for bytes, i.e., eight-bit data words, an y value of ten is a satisfactory initial value.

Beginning with the selected initial value of y, the y-bit words corresponding to the selected (d,k) characteristics are selected. The selection takes into account adjacency requirements. For example, for (2,7) codes, all of the y-bit words having adjacent binary ones are eliminated. Of the remaining y-bit words, those having isolated single binary zeros or more than seven consecutive zeros are eliminated. To insure the code is constant over adjacent encoded words, the remaining y-bit words having one or two leading zeros and one or two final zeros are selected. (Other adjacency criteria can be used.) If the number of selected y-bit words are fewer than km, then y is incremented by one and the described selection process repeated.

The process so far described with a k value of one has been used in the prior art to select (d,k) encoded words. The additional steps described below according to the invention are used to generate a suitable PPT encoding.

From the selected y-bit encoded words, only those with a ratio of total number of binary ones to total number of binary zeros equal to the selected value of r are retained for a k value of one. If the number of selected code words is less than m, y is incremented and a new subset of y-bit words is selected according to the foregoing described criteria.

Another way of selecting the encoded y-bit words to result in an average value of r over pairs of encoded words is to select two encoded words for each data word where k is equal to two. The two words are selected so that the average of binary ones to binary zeros over pairs of encoded words is r. That is, if y is 12, then a first encoded word of each pair of encoded words is selected to have five binary ones and the second, three. Therefore, over two encoded words (24 bits), the number of binary ones will be eight so that the average value of r is 8/24 or ⅓. Similarly, the number of ones in each pair could be six and two, respectively.

When recording the encoded words, alternate first and second words of successive data are selected to maintain the ratio r at ⅓.

Another way of encoding data words is by selecting encoded words of ky bits, each such word comprising y-bit words having r values that are substantially the same. By encoding components of such words over an interval of several words, the value of r is maintained.

For a k value of three, three encoded words (a total of 36 bits) can be assigned to each data word so that the sum of binary ones is 12. Therefore, over three encoded words, the ratio r remains ⅓. This can be generalized to selecting k encoded words for each data word so that he sum of binary ones over the k words is rky.

The characteristics described result in the notch adjacent to the d-c component being limited in excursion and better stabilized than codes selected by other methods when used with PPT recordings.

Assignment of the encoded words to data words can be made in other ways that are within the skill of the art. For example, if the statistics of the data words are known, only one encoded word per data word can be assigned where, even though the ratio of ones to zeros in individual words may vary about the value of one-third, predetermined sequences will average to the fraction one-third.

The process described teaches a method of encoding data words suitable for use with PPT optical recording. The process is also useful for encoding data for RZ (return-to-zero) recording on magnetic and similar media.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A method of generating y-bit words especially suitable for PPT or RZ recording techniques comprising the steps of:
    selecting from the set of $2^y$ possible ybit words a subset to be recorded using pit-per-transition recording techniques according to predetermined characteristics including adjacency requirements; and
    choosing from said subset code words producing a predetermined gray scale greater than zero and less than one-half.

2. The method claimed in claim 1 including an intermediate step of determining a gray scale as a desired ratio of a shorter recording interval of a binary value to the recording interval of the other binary value.

3. A method of encoding xbit data words to y-bit encoded words, where y is greater than x, according to predetermined (d,k) characteristics, comprising the steps of:
    eliminating from all possible y-bit encoded words those not meeting a given criteria to form a first remaining subset;
    selecting from said first remaining subset those words having adjacency characteristics to form a second remaining subset, said adjacency characteristics including at least one leading zero and at least one trailing zero; and
    choosing from the second remaining subset a third remaining subset having a ratio of binary ones in a recorded stream of encoded words substantially equal to a given ratio.

4. The method claimed in claim 3 wherein the given ratio in said choosing step is less than one-half and greater than zero.

5. The method claimed in claim 4 wherein said given ratio is maintained for each encoded word.

6. The method claimed in claim 3 wherein the given ratio in said choosing step is substantially one-third.

7. The method claimed in claim 6 wherein said given ratio is maintained for e encoded word.

8. The method as claimed in claim 3 wherein said eliminating step employs a (d,k) characteristic as said given criteria that eliminates each encoded word having fewer then d zeros and more than k zeros between adjacent binary ones.

* * * * *